G. DALÉN.

SIGNAL LIGHT APPARATUS.

APPLICATION FILED FEB. 19, 1909.

Reissued Apr. 13, 1909. 12,940.

ATTEST.

Bert M. Stahl

Edwd K. Tolson.

INVENTOR.

GUSTAF DALEN.

BY Jno. Malcolm Whitt

ATTY'S

UNITED STATES PATENT OFFICE.

GUSTAF DALÉN, OF STOCKHOLM, SWEDEN, ASSIGNOR TO AKTIEBOLAGET GASACCUMULATOR, OF STOCKHOLM, SWEDEN, A CORPORATION OF SWEDEN.

SIGNAL-LIGHT APPARATUS.

No. 12,940. Specification of Reissued Letters Patent. Reissued April 13, 1909.

Original No. 857,035, dated June 18, 1907, Serial No. 301,300. Application for reissue filed February 19, 1909. Serial No. 478,902.

*To all whom it may concern:*

Be it known that I, GUSTAF DALÉN, a subject of the King of Sweden, residing at Stockholm, Sweden, have invented new and useful Improvements in Signal-Light Apparatus, of which the following is a specification.

The present invention relates to improvements in light buoys and other signal-light-apparatus, designed to send out a flash or light signal at certain intervals by alternately lighting and extinguishing a gas flame, and is especially designed for employment in connection with light buoys in which acetylene is used as lighting material. In order to obtain a buoy, which without having too large dimensions, is able to burn the whole sailing year without control, it is important that the flash or period time during which the flame is burning between the dark periods be very short.

The object of the present invention therefore is to secure a flash of very short duration, say a fraction of a second, by means of an apparatus of extreme simplicity and cheapness, great durability, and efficiency.

The invention comprises the features of construction hereinafter described and particularly pointed out in the appended claims.

An embodiment of the invention is illustrated in the accompanying drawings, in which—

Figure 2:
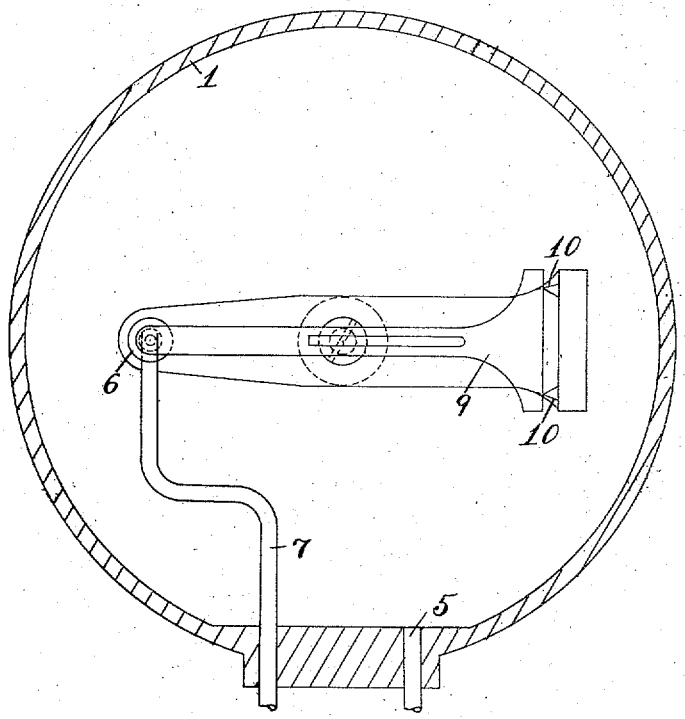
Figure 1:
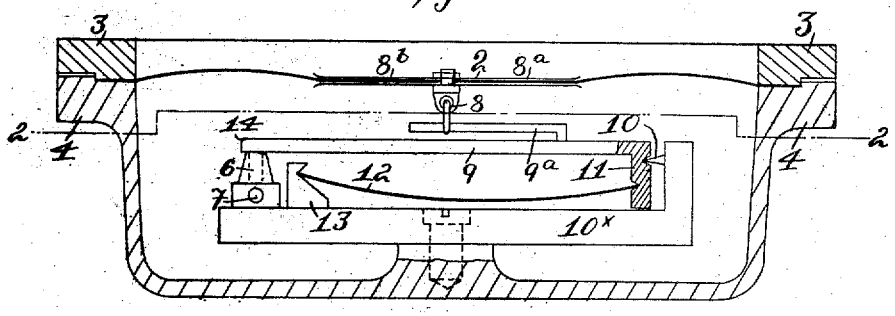

Figure 1 is a vertical section and Fig. 2 a horizontal section on line 2—2 of Fig. 1.

In this drawing the numeral 1 indicates a casing having an open side which is covered by a diaphragm or membrane 2 held between a clamping ring 3 and a flange 4 of the casing 1. A gas supply conduit 5 leads to this casing from an acetylene generator of any suitable construction not shown on the drawings while a delivery conduit 7, connected with the valve body 6, leads to the burner (also not shown). The diaphragm 2 is connected by means of clamping plates $8^a$ and $8^b$ and a link 8 to an arm $9^a$ rigidly carried on a lever 9, the end of which constitutes the valve 14, which corresponds to a seat in the valve body 6. The opposite end of the lever is pivotally supported by knife edges 10 on the angular end of a stud $10^x$ extending from the casing 1. Between a projection 11 of said latter end of the lever 9 and a stud 13 of the casing, a blade spring 12 is inserted, the ends of the spring resting in notches in the respective parts and its tension tending to move the lever into position to close the valve. One of the parts 6 or 14 is made of magnetized material, preferably the valve body 6 so that it tends to hold the end 14 of the lever firmly in position to cut off the flow of gas.

From the foregoing description it is thought the operation of the device will be apparent but it may be briefly stated as follows: From the source of supply gas will pass through pipe 5 to the casing at a higher pressure than that which is prevailing in the burner. The casing thus is filled with gas, the pressure of which is continually increasing. The strength of the spring 12 is so adjusted that the spring is balanced by the pressure on the diaphragm, when the pressure in the casing is that which is required in the burner. When this pressure is prevailing in the casing 1, the valve 14 will be closed owing to the magnetic action between the valve body 6 and the valve 14. But when the pressure in the casing is increased sufficiently to overcome the magnetic attraction, the valve 14 will be suddenly pulled from its seat owing to the displacement upward of the diaphragm. By this displacement the volume of the gas is suddenly increased producing a sudden expansion of the gas, and simultaneously the gas flows out through the wide open valve and through the conduit 7 to the burner, producing immediately a full sized flame. The gas however can not expand so as to reduce the pressure below that required in the burner, as the spring 12 then will overcome the pressure on the diaphragm and move the valve 14 toward the seat, whereby, as soon as the valve comes within the sphere of magnetic attraction of the valve body, the valve is suddenly shut without any previous throttling of the same. During the time the valve 14 is open, the flame will burn at full size in the burner and by adjusting the flow in the inlet pipe 5 and the strength of the magnetism in the valve seat 6, the time can be varied. It will be noted that the flame will burn with practically constant pressure owing to the arrangement of the spring 12, which is of great advantage.

In order that the spring 12 may exercise accurately the same pressure in its compressed as in its expanded position, it is made in the form of a leaf spring, and is inserted between two studs 11 and 13, but the invention is not limited to this precise form of spring.

Having thus described my invention what I claim is:—

1. In light signal apparatus, a casing having an expansible diaphragm, gas supply and delivery pipes, a valve inclosed in the casing and controlling the passages of the gas through the pipes, a magnetic means for operating the valve, and means for operating the valve positively against action of the magnetism.

2. In light signal apparatus, a casing having an expansible diaphragm, gas supply and delivery pipes, a valve inclosed in the casing and controlling the passages of the gas through the pipes, a seat for the valve, one of said parts being made of magnetized material and means for operating the valve positively against the action of the magnetism.

3. In light signal apparatus, a casing having an expansible diaphragm, gas supply and delivery pipes, a valve inclosed in the casing and controlling the passage of the gas through the pipes, a magnetic valve seat for said valve and means for automatically and positively opening the valve against the action of the magnetism.

4. In light signal apparatus, a casing having an expansible diaphragm, gas supply and delivery pipes, a valve inclosed in the casing and controlling the passage of gas, a magnetic valve seat for said valve, a lever connection between the valve and the diaphragm for positively actuating the valve and a spring tending to close the valve against the action of the pressure on the membrane.

5. In light signal apparatus, a casing having an expansible diaphragm, a lever connected to the diaphragm, knife pivots for said lever at one end, the opposite end of said lever forming a valve, a magnetic valve body having a seat coöperating with the end of the lever, a gas supply pipe to the casing, a delivery pipe leading from the valve body, and a leaf spring acting on the lever.

6. In a signal light apparatus, a casing, a gas outlet therefrom, a valve controlling said outlet, magnetic means for holding the valve to its seat, and means for exerting a force upon the valve in opposition to the magnetic action whereby the opening and closing of the valve is suddenly effected so that the flash of light burns full size but for short periods, thus economizing in the amount of gas used, substantially as described.

7. In a signal light apparatus, a casing, a gas delivery pipe, a valve controlling the flow of gas, magnetic means for holding the valve in one position, and means actuated by the pressure of gas for overcoming the power of the magnet so as to actuate the valve suddenly, substantially as described.

8. In a signal light apparatus, a casing, a gas delivery pipe, a valve controlling the flow of gas, magnetic means for holding the valve to its seat, an expansible diaphragm, and connections actuated by the movement of the diaphragm for unseating the valve, substantially as described.

In testimony whereof I have signed my name in the presence of two subscribing witnesses.

GUSTAF DALÉN.

Witnesses:
WM. WALLACE WHITE,
ELLA L. GILES.